US011911760B2

(12) United States Patent
Mahakalkar et al.

(10) Patent No.: US 11,911,760 B2
(45) Date of Patent: Feb. 27, 2024

(54) CAPS FOR ASSAY DEVICES

(71) Applicant: Plexium, Inc., San Diego, CA (US)

(72) Inventors: Kapil Mahakalkar, San Diego, CA (US); Kenneth Chng, San Diego, CA (US); Jesse Lu, San Diego, CA (US); Edgar Gutierrez, San Diego, CA (US); Yi Zhang, San Diego, CA (US)

(73) Assignee: Plexium, Inc., San Diego, CA (US)

( * ) Notice: Subject to any disclaimer, the term of this patent is extended or adjusted under 35 U.S.C. 154(b) by 102 days.

(21) Appl. No.: 17/353,693

(22) Filed: Jun. 21, 2021

(65) Prior Publication Data

US 2021/0308668 A1 Oct. 7, 2021

Related U.S. Application Data

(63) Continuation of application No. 16/774,875, filed on Jan. 28, 2020, now Pat. No. 11,040,343.

(51) Int. Cl.
*B01L 3/00* (2006.01)

(52) U.S. Cl.
CPC ....... *B01L 3/5025* (2013.01); *B01L 2200/026* (2013.01); *B01L 2300/042* (2013.01); *B01L 2300/0829* (2013.01)

(58) Field of Classification Search
CPC ....................... B01L 3/5025; B01L 2300/0816
USPC .................................................. 422/504, 603
See application file for complete search history.

(56) References Cited

U.S. PATENT DOCUMENTS

2002/0164820 A1* 11/2002 Brown ................ C12Q 1/6806
435/6.12

* cited by examiner

*Primary Examiner* — Natalia Levkovich
(74) *Attorney, Agent, or Firm* — Sheppard Mullin Richter & Hampton LLP

(57) ABSTRACT

This disclosure provides for devices and methods for conduction assays for combinatorial libraries. The devices comprise a multiplicity of wells and a removable cap.

9 Claims, 6 Drawing Sheets

CAPS FOR ASSAY DEVICES

RELATED APPLICATION

This application is a continuation of U.S. patent application Ser. No. 16/774,875, filed on Jan. 28, 2020, and to be issued as U.S. Pat. No. 11,040,343 on Jun. 22, 2021, the disclosure of which is expressly incorporated by reference herein.

FIELD OF THE INVENTION

This disclosure provides for devices and methods for conducting assays for combinatorial libraries. The devices comprise a multiplicity of wells and a removable cap. When wells comprise an aqueous assay solution, the cap protects against contamination of that solution. In addition, the cap as described herein, creates a fluid passageway over the top of wells in the assay device thereby allowing for placement of a layer of a hydrophobic fluid over the wells and the top surface of the device. That fluid layer prevents evaporation of water from an aqueous solution in the wells and also inhibits contaminants from entering such wells.

STATE OF THE ART

Combinatorial libraries are well known in the literature and often utilize beads where each bead contains multiple copies of a single compound bound by a linker to the bead. In addition, the bead typically contains a reporting element such as DNA that allows for assessing the structure of the single compound on the bead. Many of these libraries are limited by the fact that the compound being tested remains on the bead during the assay. As such, the biological data generated by the assay is potentially compromised by the possibility that the bound compound is not able to effectively bind to the target of choice. This could be due to physical interference arising from the bead as well as possible steric interference due to the linker connecting the compound to a bead. As to the latter, this linkage could inhibit the ability of an otherwise potent compound from binding properly to the target thereby providing assay results that evidence less than the actual potency of the compound.

One option to address this problem is the use of cleavable linkers that cleave under proper stimulation (e.g., light), thereby freeing the compound from the bead. Once the compound is in solution, such as in a test well, it is free to orient itself in a manner that provides maximum potency in the assay. Still further, release of these compounds can be conducted in a manner such that the amount of compound released is controlled so as to provide meaningful dose dependent data. See, e.g., US Patent Application Pub. No. 2019/0358629, which is incorporated herein by reference in its entirety.

It is generally desirable that the assay employ as many test compounds as possible. However, the number of individual compounds that can be tested in an assay is generally limited by the number of wells on the assay device. Increasing the number of individual wells to accommodate larger libraries raises yet another problem. If adjacent wells are too close to each other, then a portion of the solution in one well may spill-over and contaminate the solution in an adjacent well. Any spill-over from one well to an adjacent well contaminates the adjacent well. Such contamination can alter the results by providing for either a false positive or dilute the reported activity of an active compound. The former can occur when the test compound in solution is active in a first well and a portion of that solution "spills-over" to an adjacent well with an inactive compound. This results in the adjacent well now having active compound in solution which then erroneously reports that there is activity in that well. The latter can occur when spill-over from a well with an inactive compound contaminates an adjacent well with an active compound and reduces the concentration of that active compound such that the reported activity is less than the actual activity when reported in a dose-dependent manner.

The spill-over problem is particularly relevant when the assay device contains a large number of wells in close proximity to each other. In order to maintain a workable size for the device, well density is increased to the point that aqueous solutions in one well can spill-over and contaminate an adjacent well. At such a density, the assay results become less reliable with reliability decreasing with increasing cell density. This creates a conundrum for the technician. In one case, an assay device could be used that separates the wells from each other by such a distance that it no longer can accommodate a large number of wells (e.g. the well density is too low). In another case, an assay device could be used that allows for spill-over to occur. In that case, the assay results are less reliable.

SUMMARY

One solution to this problem is to include a water repellent coating in the partitions between each well in order to inhibit spill-over. See, for example, U.S. patent application Ser. No. 16/774,871 entitled "Assay Devices for Combinatorial Libraries," and is incorporated herein by reference in its entirety.

Moreover, in order to allow for very large numbers of wells on a single device, the volume of each well must be very small. For example, a well with a diameter of about 150 microns and a depth of 150 microns when partially filled to about 40% of capacity will have about 0.001 microliters of aqueous solution. Such small amounts of fluid require protection against contamination of the wells (e.g., by airborne contaminants) and to prevent evaporation of water from the wells. The latter is particularly relevant when the assay is being conducted in a concentration dependent manner where any evaporation of water from a given well alters the concentration of the compound in that well.

The inclusion of a fixed or permanent cap over the wells in the assay device would make the addition of assay components (e.g., beads, aqueous solution, target, etc.) to each well difficult or impossible. Still further, a temporary cap that fits on the top surface of the assay device could result in spill-over when that cap was removed if any suction of the cap to the device is generated.

As such, there is an ongoing need to provide for assay devices that are designed to protect the aqueous solution in each well from contamination and/or evaporation such that the results of assays conducted in each well are reliable. Such a device represents a need in the art.

In one embodiment, this disclosure provides for an assay device (1) containing wells (10) wherein the assay device comprises a removable cap (30) proximate to but not abutting the top surface of wells (10). This cap (30) is configured to create a sealed fluid passageway (5) over wells (10) that protects against contamination and/or evaporation.

In one embodiment, this disclosure provides for an assay device (1) comprising:

i) assay device component (1*a*) having at least one row (20) of wells (10) each of which are defined by well floor (12), well diameter (14) and well height (15) and where any first well (10*a*) is separated from an adjacent second well (10*b*) by a partition (16), said assay device component (1*a*) terminates in a top surface (2) which comprises the surface partitions (16) and the top of said wells (10);

ii) a platform (7) that extends over at least a portion of the surface (2) of assay device component (1*a*), but not over rows(s) (20) so as to recess row (20) from the top surface of platform (7); and iii) each row (20) terminates at one end with an inlet port (3*a*) and at the opposite end with an outlet port (4*a*);

wherein the assay device component (1*a*) and platform (7) are configured to accept and maintain a biocompatible removable cap (30)

said cap (30) comprises a bottom surface (31) wherein the configuration of assay device component (1*a*), platform (7), inlet (3*a*), outlet (4*a*), and bottom surface (31) of cap (30) allows cap (30) to be maintained on platform (7) so as isolate row (20) thereby defining a sealed fluid passageway (5) that extends from inlet port (3*a*) to outlet port (4*a*) and through the space defined by top surface (2) of assay device component (1*a*), said platform (7), and the bottom surface (31) of cap (30) the height of said space being defined by the height of platform (7); and further wherein said sealed passageway (5) provides said fluid communication in a substantially horizontal direction relative to the top of wells (10).

In one embodiment, this disclosure provides for a kit of parts comprising:

A) assay device (1) which comprises:

i) assay device component (1*a*) having at least one row (20) of wells (10) each of which are defined by well floor (12), well diameter (14) and well height (15) and where any first well (10*a*) is separated from an adjacent second well (10*b*) by a partition (16), said assay device component (1*a*) terminates in a top surface (2) which comprises the surface of partitions (16) and the top of said wells (10);

ii) a platform (7) that extends over at least a portion of surface (2) of assay device component (1*a*) but not over rows(s) (20) so as to recess row (20) from the top surface of platform (7);

iii) each row (20) terminates at one end with an inlet port (3*a*) and at the opposite end with an outlet port (4*a*);

wherein assay device component (1*a*) and platform (7) is configured to accept and maintain a removable biocompatible cap (30);

B) a removable biocompatible cap (30) comprising a bottom surface (31) wherein the configuration of assay device component (1*a*), platform (7), inlet (3*a*), outlet (4*a*), and bottom surface (31) of cap (30) allows cap (30) to be maintained on platform (7) so as to isolate row (20) thereby defining a sealed fluid passageway (5) that extends from inlet port (3*a*) to outlet port (4*a*) and through the space defined by top surface (2) of assay device component (1*a*), said platform (7), and the bottom surface (31) of cap (30) the height of said space being defined by the height of platform film (7*a*); and further wherein passageway (5) provides said fluid communication in a substantially horizontal direction relative to the top of wells (10).

In one embodiment, row (20) of assay device (1) comprises a high density of wells (10) aligned thereon wherein each of said wells (10) comprises:

a) a floor (12) and a height (15) that define diameter (14) and depth (15) the dimension of which are configured to retain assay components (60); and b) partitions (16) separating any two adjacent wells (10*a*) and (10*b*) from each other provided that each of said partitions is at least about 10 microns in length from the nearest edge of a first well (10*a*) to the nearest edge of a second well (10*b*) wherein said second well (10*b*) is a nearest neighbor from the first well (10*a*).

In one embodiment, each of said partitions (16) of said device (1) comprises a hydrophobic water repellant layer that is incorporated onto at least a portion of surface (2) on said partitions (16).

In one embodiment, said row (20) has a density of well (10) of at least 10 wells per square millimeter.

In one embodiment, cap (30) covers row (20) and together with platform (7) isolates row (20) within a sealed conduit on surface (2) of assay device component (1*a*).

In one embodiment, said assay device (1) comprises a single row and a single pair of inlet reservoir (3)/inlet port (3*a*) and outlet reservoir (4)/outlet port (4*a*).

In one embodiment, said assay device (1) comprises multiple rows (20) and multiple pairs of inlet reservoir (3)/inlet port (3*a*) and outlet reservoir (4)/outlet port (4*a*) where each pair is aligned with each row (20).

In one embodiment, platform (7) is incorporated onto a portion of top surface of assay device component (1*a*) and extends sufficiently upward so that the top of platform (7) is higher than inlet port (3*a*) and outlet port (4*a*). In one embodiment, inlet port (3*a*) is in fluid communication with an inlet reservoir and outlet port (4*a*) is in fluid communication with an outlet reservoir.

In one embodiment, platform (7) is incorporated onto the bottom surface of cap (30) and extends sufficiently downward so that the bottom surface (31) of cap (30) is higher than inlet port (3*a*) and outlet port (4*a*) but below the top of inlet reservoir (3) and outlet reservoir (4).

In one embodiment, platform (7) is a platform film (7*a*) placed over that portion of surface (2) other than row (20) so as to recess row (20) below said platform film (7*a*) thereby isolating row (20). In this embodiment, row (20) is now recessed relative to film (7*a*).

In one embodiment, platform (7) is a pair of shoulders (7*b*) that are placed adjacent to each side of row (20) running from inlet port (3*a*) to outlet port (4*a*) so as to recess row (20) below said shoulders (7*b*).

In one embodiment, platform (7) is a set of shoulders (7*b*) that are placed around the perimeter of surface (2) so as to recess row (20) below said shoulders (7*b*).

In each of the above embodiments, platform (7) places the bottom (31) of cap (30) relative to surface (2) of assay device component (1*a*) such that cap bottom (31) is spaced above inlet port (3*a*) and outlet port (4*a*) but below the top of inlet (3) and outlet (4) such that, when cap (30) is positioned on said platform (7), a sealed passageway (5) is created. Said sealed passageway runs from said inlet port (3*a*) through the space defined by platform (7), row (20), cap (30) and outlet port (4*a*).

In one embodiment, assay device (1) comprises from 10,000 to 2,500,000 wells (10).

In one embodiment, assay device (1) comprises a single row (20).

In one embodiment, assay device (1) comprises multiple rows (20) that are preferably aligned in parallel.

In one embodiment, assay device (1) comprises

A) assay device (1) which comprises:

i) assay device component (1*a*) having at least one row (20) of wells (10) each of which are defined by well floor (12), well diameter (14) and well height (15) and where any first well (10*a*) is separated from an adjacent second well (10*b*) by a partition (16), said assay device component (1*a*) terminates in a top surface (2) which comprises the surface of partitions (16) and the top of said wells (10);

ii) a platform (7) that extends over at least a portion of the surface (2) of assay device component (1*a*) but not over rows(s) (20) so as to recess row (20) from the top surface of platform (7); and iii) each row (20) terminates at one end with an inlet port (3*a*) and at the opposite end with an outlet port (4*a*);

wherein device component (lb) is configured to accept and maintain a biocompatible removable cap (30);

B) a removable biocompatible cap (30) having a bottom surface (31) wherein the configuration of assay device component (1*a*), platform (7), inlet (3*a*), outlet (4*a*), and bottom surface (31) of cap (30) allows cap (30) to be maintained on platform (7) so as to isolate row (2) thereby defining a sealed fluid passageway (5) that extends from inlet port (3*a*) to outlet port (4*a*) and through the space defined by and sealed by top surface (2) of assay device component (1*a*), said platform (7), and the bottom surface (31) of cap (30) the height of said space being defined by the height of platform (7); and further wherein sealed fluid passageway (5) provides said fluid communication in a substantially horizontal direction relative to the top of wells (10)

C) said wells (10) in said assay device (1) comprise assay components (60) sufficient to run an assay.

In one embodiment, inlet reservoir (3) is a syringe or a pipette loaded with a desired fluid where said outlet tip of said syringe or pipette mates with inlet port (3*a*) and, when mated, allows for introduction of fluid into the passageway (5).

In one embodiment, inlet reservoir (3) is a needle connected to a pump comprising a desired fluid. Said needle mates with inlet port (3*a*) and the pump can continuously deliver said fluid into passageway (5) under controlled pressure and delivery rates.

In one embodiment shown in the figures, inlet reservoir (3) is a well fixed in place over inlet port (3*a*) said well is in fluid communication with said inlet port (3*a*) so that fluid in the inlet reservoir (3) flows through inlet port (3*a*) and then into and through passageway (5).

In one embodiment, fluid outlet (4) is overflow from outlet port (4*a*) wherein fluid in excess of the volume capacity of passageway (5) flows out of (4*a*).

In one embodiment shown in the figures, fluid outlet (4*a*) is a well fixed in place over outlet port (4*a*) said well is in fluid communication with said outlet port (4*a*) so that fluid in excess of volume capacity of passageway (3) flows out of outlet port (4*a*) and then into and fluid outlet (4).

DETAILED DESCRIPTION

Figure 1A:
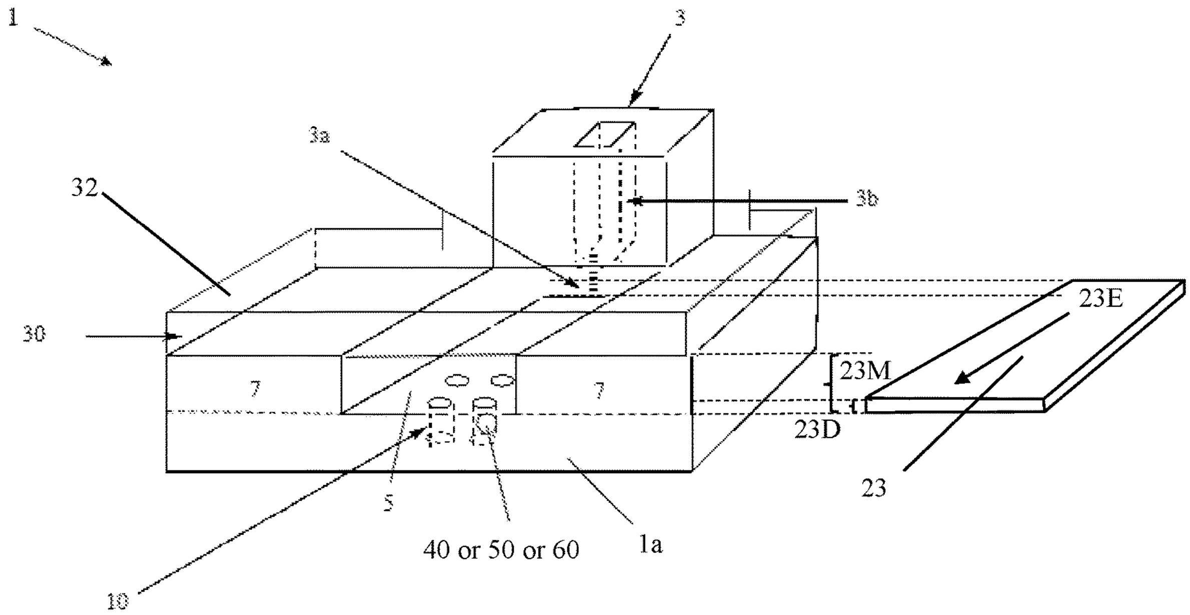
FIG. 1A illustrates a cross section view of an assay device (1) defining a sealed fluid passageway (5) when used in conjunction with a cap (30).

Referring to FIG. 1A, there is shown a cross-section of one embodiment of device (1). Device (1) includes an assay device component (1*a*) which comprises a plurality of wells (10) configured to hold individual assay components (60) which may be beads, cells, or a combination of the two. Assay device (1) also features a removable cap (30) which may be placed on device (1) or provided in an unattached form. When placed on device (1), cap (30) rests on platform (7) where that position creates a sealed fluid passageway (5) bounded by the top surface of assay device component (1*a*), the bottom surface of cap (30) and the walls of platform (7). Sealed fluid passageway (5) is in fluid communication with a fluid inlet (3) via inlet port (3*a*) which allows for the introduction of a fluid (typically an oil less dense than water) to fill sealed fluid passageway (5) covering (and thereby protecting) the contents of wells (10). The design of fluid introduction via assay device (1) allows the sealed fluid passageway (5) to fill by horizontal flow of the fluid to avoid disturbing the contents of wells (10) and preventing spillover of contents from one well to a neighboring well. An outlet port (4*a*, see FIG. 1B for example) is disposed distal to inlet port (3*a*). Outlet port (4*a*) allows the user to visually see that sealed fluid passageway (5) is completely filled as excess fluid emerges from port (4*a*). Finally, platform (7) may be configured to be monolithic with assay device component (1*a*), allowing cap (30) to be placed on platform (7) or platform (7) may be configured to be monolithic with cap (30), allowing platform (7) to be placed onto the surface of assay device component (1*a*). However, prior to describing this invention in more detail, the following terms will first be defined. If not defined, terms used herein have their generally accepted scientific meaning.

For ease of reference, the numerous apparatus and numbers used herein are summarized as follows:

Assay Device

Assay device (1)—comprises assay device component (1*a*) the top surface (2) thereof having one or more rows (20) each of which contains a multiplicity of wells (10) where assays are conducted. Any numbers recited herein that range from (1) to (7*b*) correspond to an element of assay device (1) other than wells (10) as follows:

Assay device (1)
Assay device component (with wells) (1_a_)
Device component (1_b_) (combination of 1_a_ and 7_a_)
Top surface of assay device component (2)
Fluid inlet or inlet reservoir (3)
Fluid inlet port (3_a_)
Fluid outlet or outlet reservoir (4)
Fluid outlet port (4_a_)
Sealed fluid passageway (5)
Platform (7)
Platform film (7_a_)
Shoulder (7_b_)

Wells

Wells (10)—are found on the top surface (2) of assay device component (1_a_). Wells (10) are arranged in any suitable manner on said top surface (2) including over a portion or the entirety of the top surface (2). Any numbers recited herein that range from (10) to (19) correspond to an element of well (10) as follows:

Wells (10)
First Well (10_a_)
Second well (nearest neighbor) (10_b_)
Well surface (11)
Well floor (12)
Well diameter (14)
Well height (15)
Well partition (16)
Water repellant layer (not shown)
Partition surface (19)

Rows

Row (20) comprises wells (10). These wells (10) are preferably arranged into one or more rows (20) on the top surface (2) of assay device (1). Such can be a single row (20) or multiple separate rows (20), the latter of which are preferably arranged in parallel. Any numbers recited herein that range from (20) to (29) correspond to an element of row (20) as follows:

Row (20)
Row Surface (21)
Water repellent layer (not shown)
hydrophobic fluid layer (not shown)

Cap

Cap (30) has bottom surface (31) the dimensions of which permit cap (30) to lay above surface (2), fluid inlet port (3_a_), and fluid outlet port (4_a_) of assay device (1) thereby defining a sealed fluid passageway (5) as described herein. Any numbers recited herein that range from (30) to (31) correspond to an element of cap (30) as follows:

Cap (30)
Bottom surface of cap (31)
Top surface of cap (opposite side of 31)

Beads

Beads—comprise multiple copies of the same compound and can be magnetic and non-magnetic beads having a diameter and a height. When beads are spherical, then the diameter and height are identical.

Cell

Cell is a mammalian cell such as a murine cell, a porcine cell, a primate cell (including a human cell), and the like. Cell can be used in assay device (1) to assess the biological activity of a test compound.

Assay Component

Assay component (60) refers to any component used in well (10) to conduct the assay. In one embodiment, the assay component (60) is one or more of the following—bead, cell including a human cell such as a HeLa cell, buffers, salts, nutrients, water, reporter molecules, DNA, RNA, and the like. Any feature noted below corresponds to an assay component (60) as follows:

Assay component (60)
Target (not shown)

The terminology used herein is for the purpose of describing particular embodiments only and is not intended to be limiting of the invention. As used herein, the singular forms "a", "an" and "the" are intended to include the plural forms as well, unless the context clearly indicates otherwise.

"Optional" or "optionally" means that the subsequently described event or circumstance can or cannot occur, and that the description includes instances where the event or circumstance occurs and instances where it does not.

The term "about" when used before a numerical designation, e.g., temperature, time, amount, concentration, and such other, including a range, indicates approximations which may vary by (+) or (−) 10%, 5%, 1%, or any subrange or subvalue there between. Preferably, the term "about" when used with regard to an amount means that the amount may vary by +/−10%.

"Comprising" or "comprises" is intended to mean that the compositions and methods include the recited elements, but not excluding others.

"Consisting essentially of" when used to define compositions and methods, shall mean excluding other elements of any essential significance to the combination for the stated purpose. Thus, a composition consisting essentially of the elements as defined herein would not exclude other materials or steps that do not materially affect the basic and novel characteristic(s) of the claimed invention.

"Consisting of" shall mean excluding more than trace elements of other ingredients and substantial method steps. Embodiments defined by each of these transition terms are within the scope of this invention.

The term "assay device" refers to a device that is capable of simultaneously assaying multiple test compounds against a target. Such devices contain a multiplicity of wells where each well preferably contains multiple copies of substantially the same compound. The device comprises a very large number of wells. In one embodiment, the number of wells ranges from about 5,000 to about 2,000,000. In one embodiment, the well density on the device is at least 10 wells per square millimeter and the number of wells is at least about 5,000.

The term "assay component" refers to components that are required to conduct a particular assay. Assay components include but are not limited to water, salts, buffers, beads, cells, nutrients, test compounds, marker compounds, and the like.

The term "bead" refers to beads well known in the art for use in combinatorial chemistry. In one embodiment, the surface of bead comprises a multiplicity of the same test compound bound thereto through a cleavable linker. Beads may also comprise DNA barcodes that record the structure of the test compound or the synthetic steps used to synthesize the compounds. These barcodes are attached to beads either by cleavable or non-cleavable linker. If the barcodes are attached via a cleavable linker, then preferably, the cleavable linker used with the barcodes is cleaved by a mechanism different from that of the test compound.

In another embodiment, a bead contains multiple copies of the same reporter molecule either on the same bead having bound thereto multiple copies of a test compound or on a separate bead. One example of a reporter molecule is a fluorescent molecule linked to a bead via a cleavable linker. Preferably, the reporter molecule is attached using the same cleavable linker that is used to bind the test compound to bead. When so used, a bead may include a quencher molecule that is bound proximate to the fluorescent molecule on a bead so as to attenuate the fluorescence generated. Preferably, the quencher molecule is bound to the bead by either a non-cleavable bond or by a cleavable bond that is preferably cleaved by a mechanism that is different than the cleavable linker used to bind the fluorescent molecule to the bead. During an assay, knowledge of the extent of test compound released from a bead by a stimulus that cleaves the cleavable bond may be essential to that assay. Using a bead with a reporter molecule can provide that knowledge by measuring the change in fluorescence generated by release of the fluorescent compound from the bead and away from the quencher against a standard curve. See, e.g., U.S. Patent Application Pub. No. 2019/0358629 filed Aug. 7, 2019 and titled "Oligonucleotide Encoded Chemical Libraries," which is incorporated herein by reference in its entirety.

Beads are typically polymeric in form albeit with some also comprising sufficient $Fe_3O_4$ to render them susceptible to magnetic attraction. Numerous beads are commercially available and have varying sizes, e.g., about 0.1 microns to 10 or more microns including amino functionalized beads, carboxyl functionalized beads, magnetic beads with functional groups, etc. See, for example, Spherotech, Inc., Lake Forest, Ill., USA, and Agilent, Inc., Santa Clara, Calif., USA. These beads are readily functionalized to contain a test compound and/or a reporter molecule using conventional chemistry well known in the art. It is understood that beads with a nominal diameter of 5 microns include beads that are smaller and larger than 5 microns with the number average being 5 microns. In order to avoid multiple beads being placed into a single well (10), one can exclude smaller beads by size exclusion filtration using a filter that passes beads below a set diameter while retaining beads above that diameter. Accordingly, in some embodiment, a bead size of 5 microns refers to beads where the beads have been filtered to remove substantially all of the beads that are smaller than 5 microns. Such beads are referred to herein as "size excluded beads". In all cases set forth herein, size excluded beads represent a preferred subset of beads. The size may be any value or subrange within the recited ranges, including endpoints.

In one embodiment, the assay component is a viable mammalian cell (60) such as a human cell. This cell is used in the assay to assess the biological activity, if any, of a given test compound. Assays using mammalian cells are well known in the art. Suitable cells include cancer cells, beta cells responsible for insulin expression, neurons, and the like.

The term "test compound" means a compound releasably bound to a bead that, when released, is to be tested for biological activity in an assay conducted in well (10) of assay device (1).

The term "releasably bound" means that a test compound bound to bead can be released by application of stimulus that breaks the bond. Such bonds are sometimes referred to herein as "cleavable" bonds. The art is replete with examples of cleavable bonds and the appropriate stimulus that breaks that bond. Non-limiting examples of cleavable bonds include those that are released by pH changes, enzymatic activity, oxidative changes, redox, UV light, infrared light, ultrasound, changes in magnetic field, to name a few. A comprehensive summary of such cleavable bonds and the corresponding stimuli required to cleave these bonds is provided by Taresco, et al., Self-Responsive Prodrug Chemistries for Drug Delivery, Wiley Online Library, 2018, onlinelibrary.wiley.com/doi/full/10.1002/adtp.201800030 which is incorporated herein by reference in its entirety.

The term "platform" means a film or layer that is fixed to and extends a portion of the top surface (2) of assay device component (1*a*) other than rows (20) such rows (20) lies recessed relative to said platform (7). Platform (7) is preferably a biocompatible material such as a polymer (e.g., plastic) that is insoluble in both water and a hydrophobic fluid.

The term "hydrophobic fluid" refers to a biocompatible liquid that is insoluble in water and has a density less than that of water. Examples of hydrophobic fluids include silicone oil, mineral oil, etc.

Assay Device

Figure 1B:
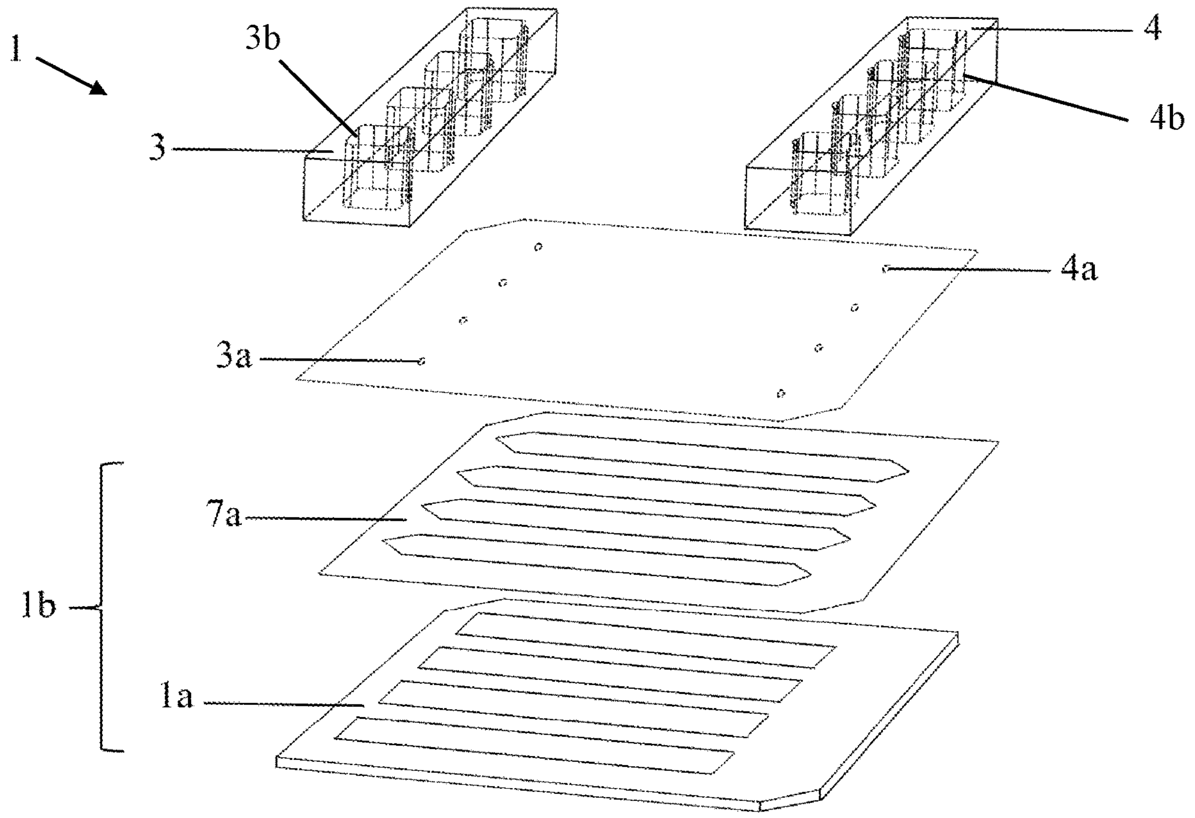
FIG. 1B illustrates an exploded view of assay device (1) that illustrates several aspects of the device including the use of thin layer, or platform film (7*a*) which is a separate sheet that contains inlet port (3*a*) and outlet port (4*a*). Fluid inlet (3) and fluid outlet (4) are optionally stand-alone components fixed to the top surface of said sheet and providing a fluid conduit from fluid inlet (3) into and through inlet port (3*a*) through passageway (5) and then out through outlet port (4*a*) and fluid outlet (4).
Figure 4:
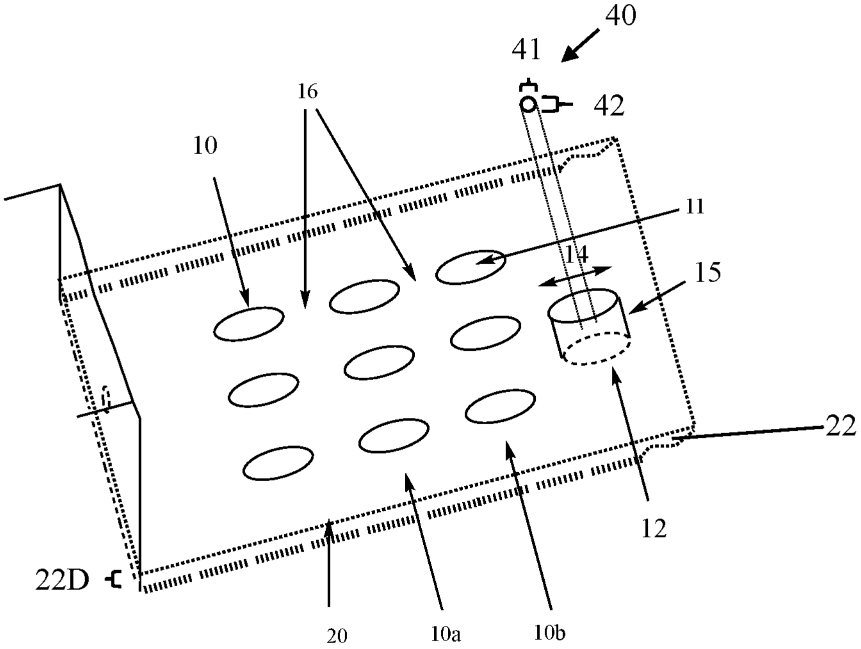
FIG. 4 illustrates a portion of row (20) containing wells (10), (10*a*) and (10*b*).

Turning to assay device (1), FIG. 1B illustrates one embodiment of assay device (1) which has multiple rows (20) of wells (10—shown in FIGS. 1A and 4). Each of row (20) is connected at its proximal end with inlet port (3*a*) connected to inlet reservoir (3) and at its distal end with outlet port (4*a*) and outlet reservoir (4). Inlet port (3*a*) and outlet port (4*a*) are illustrated as a separate layer comprising a hole that meters the flow of fluid from inlet reservoir (3) to outlet reservoir (4). In some embodiments, the platform is a layer or a film (7*a*) that fits over that portion of assay device component (1*a*) except over rows (20) and that portion extending from rows (20) to the inlet port (3*a*) and outlet port (4*a*). The film or layer is preferably one or two-sided tape that adheres to the surface of assay device component (1*a*) on one side and to film or layer comprising inlet port (3*a*) and outlet port (4*a*) provided that platform (7) does not cover said ports.

In one embodiment, inlet port (3*a*) and outlet port (4*a*) can be configured to be a small orifice at, e.g., the bottom of inlet reservoir (3) and outlet reservoir (4) rather than a separate layer with aligned holes. In such a case, the tape adheres to the bottom of reservoirs (3) and (4) but, again, not over the orifices defining inlet port (3*a*) and outlet port (4*a*).

Figure 2:
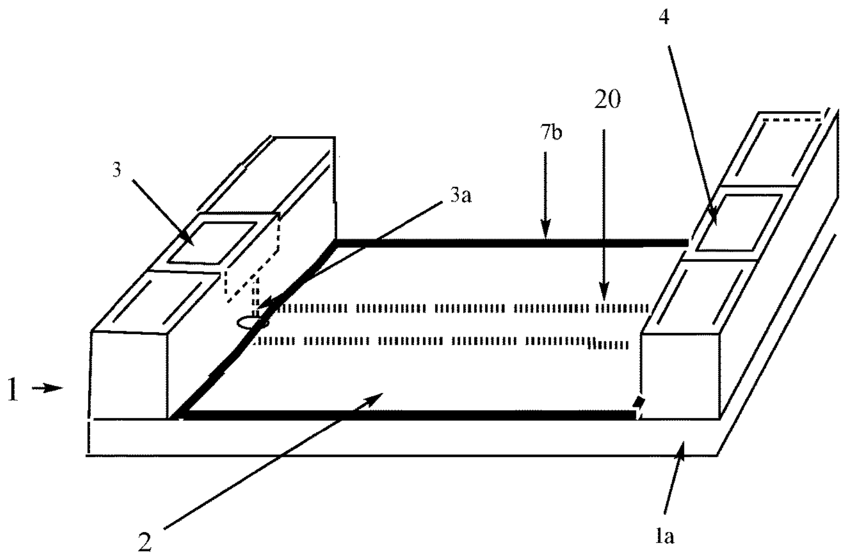
FIG. 2 illustrates row (20) of assay device (1) having fluid inlet (3)/fluid inlet port (3*a*) and fluid outlet (4)/fluid outlet port (4*a*—shown in FIG. 1B) where shoulders (7*b*) are placed on the surface perimeter of assay device component (1*a*).
Figure 5A:
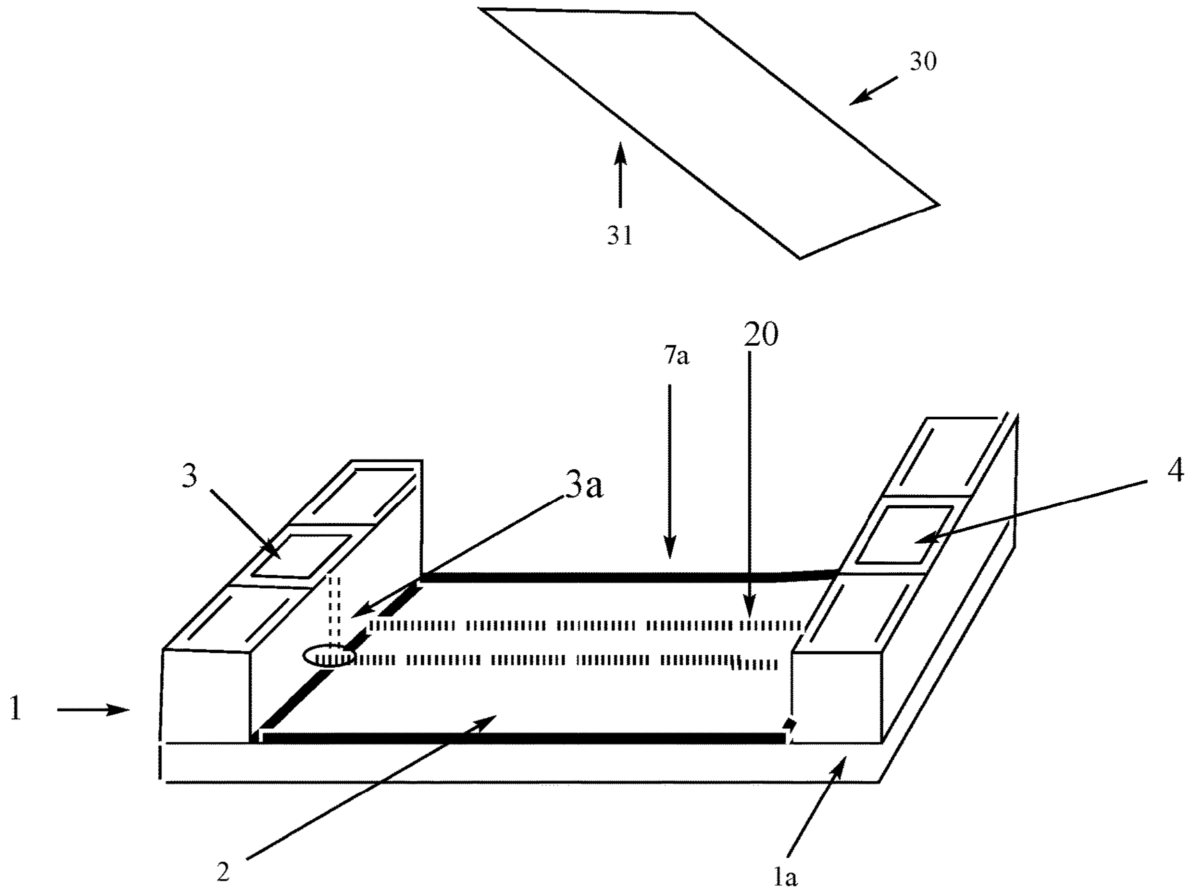
FIG. 5A illustrates removable cap (30) juxtaposed over the top surface (2) of the remaining portions of assay device (1).
Figure 5B:
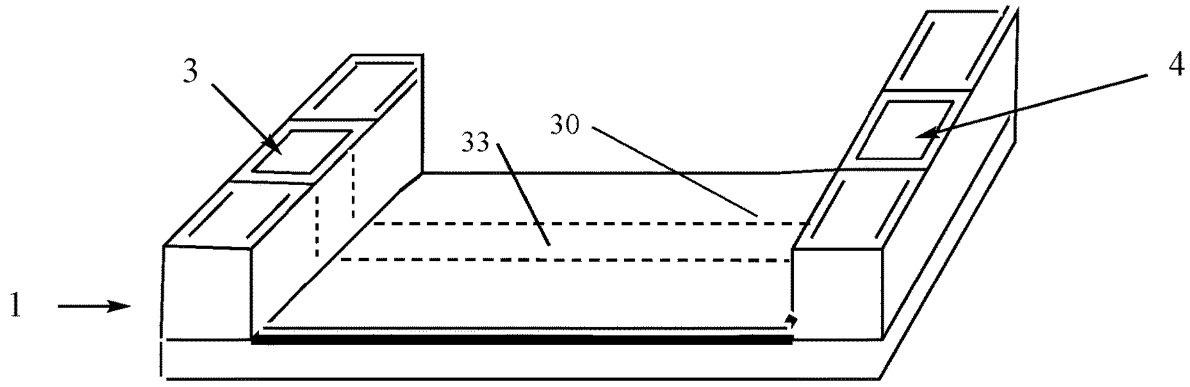
FIG. 5B illustrates removable cap (30) placed on the top surface (2) of the remaining portions of assay device (1).

In one embodiment shown in FIG. 2, platform (7) comprises shoulders (7*b*) that are placed on the perimeter of top surface (2) of assay device component (1*a*) which extend upward sufficiently to provide a base for the removable cap (30—shown in FIGS. 5A and 5B).

Figure 3:
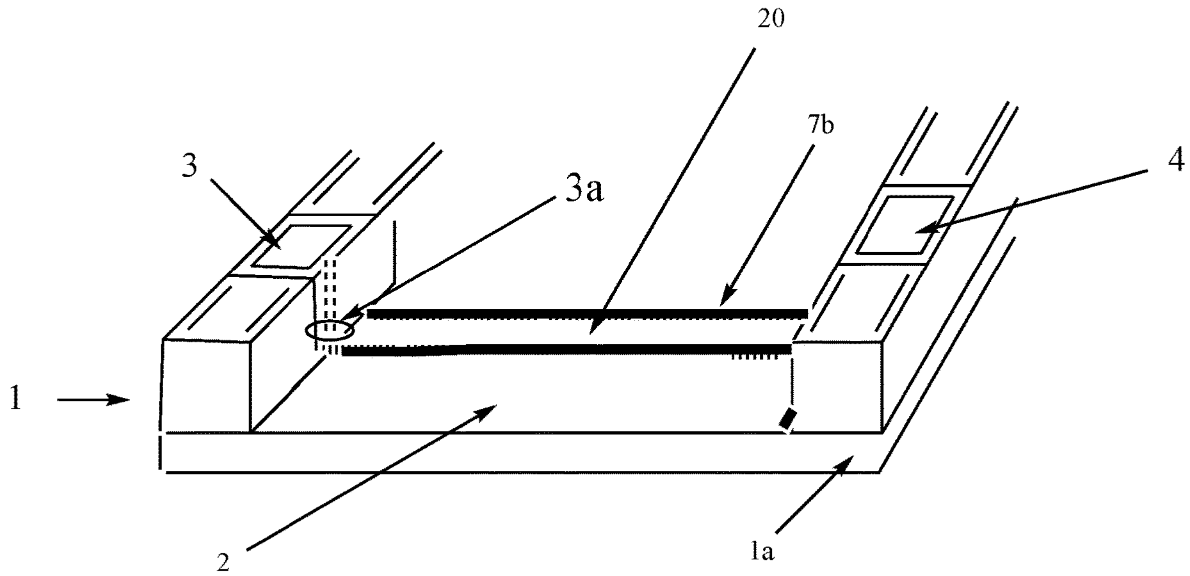
FIG. 3 illustrates row (20) of assay device (1) having fluid inlet (3)/fluid inlet port (3*a*) and fluid outlet (4)/fluid outlet port (4*a*—shown in FIG. 1B) where shoulders (7*b*) are placed on the surface perimeter of assay device component (1*a*)

In one embodiment shown in FIG. 3, a single row (20) is employed and platform (7) comprising shoulder (7*b*) is placed on both sides of row (20) which extend upward sufficiently to provide a base for the removable cap (30). It is understood that when a single row (20) is employed, the width of that row can extend to cover most of the top surface (2) of assay device component (1*a*).

In each embodiment, platform (7) extends upward sufficiently to provide a base for the removable cap (30) which covers inlet port (3*a*), outlet port (4*a*) and row (20) when cap (30) is placed onto platform (7). In one embodiment, inlet port (3*a*) and outlet port (4*a*) are positioned at the same height above the top surface of row (20). In another embodiment, inlet port (3*a*) and outlet port (4*a*) are positioned at different heights above the top surface of row (20). It is understood that inlet reservoir (3)/inlet port (3*a*) are interchangeable with outlet reservoir (4)/outlet port (4*a*) as the only distinction relates to where the fluid (not shown) is first introduced. For the sake of simplicity, the left side of assay device (1) is sometimes referred to herein as the proximal side whereas the right side of assay device (1) is referred to as the distal side. Also, for convenience and to correlate with the arbitrary assignment of proximal and distal sides, the proximal side is defined as receiving fluid and the distal side as collecting fluid.

In each embodiment, a sealed fluid conduit is generated from inlet port (3*a*) though the space defined by row (20), platform (7) and cap (30) and into outlet port (4*a*). This conduit allows for placement of a hydrophobic fluid layer to be positioned over wells (10) when filled with assay components (60). Said hydrophobic fluid layer has a depth, and a maximum depth defined by the height of platform (7). It is understood that hydrophobic fluid added to inlet reservoir (3) will traverse though inlet port (3*a*) through said conduit and then out of outlet port (4*a*). When inlet reservoir (3) and outlet reservoir (4) are employed, the addition of excess fluid into inlet reservoir will provide for equal amounts of fluid in both reservoirs after equilibrium has been achieved. The addition of hydrophobic fluid into reservoir (3) can be accomplished with a pipette, a syringe or a pump.

The hydrophobic fluid should be biocompatible especially when used in conjunction with cells as assay component (60) which is to say that the fluid is not toxic to said cells. In addition, it is necessary that any biocompatible hydrophobic fluid used is insoluble in water and is less dense than water such that the hydrophobic fluid layer floats over water. Preferably, the hydrophobic fluid used is silicon oil, mineral oil, and the like.

FIG. 4 illustrates an expanded partial view of row (20) containing wells (10). Each well (10) has floor (12), diameter (14), and height (15). In one embodiment, the density of wells in row (20) is at least about 10 wells per millimeter squared. In one embodiment, each well (10) has a height (15) of from about 50 to about 300 microns, a diameter (14) of from about 50 to about 300 microns. In one embodiment, wells (10) are cylindrical in shape. Wells (10) are aligned in row (20) such that the closest distance between the edges of adjacent wells (10*a*) and (10*b*) is at least about 10 microns. Sizes can be any value or subrange within the recited ranges, including endpoints.

In assay device (1), each well (10) is configured to conduct an assay of a single test compound disposed on an assay component (60), such as a bead. Such assays are preferably conducted by introducing a single bead into each well (10). Such beads contain multiple copies of a single test compound which is typically synthesized on beads by conventional split/pool combinatorial synthesis. Other assay components placed in the wells include, by way of example only, mammalian cells, aqueous solutions comprising buffers, salts, cellular nutrients, and the like.

FIGS. 5A and 5B illustrate placement of cap (30) over platform (7) which, in this case is a perimeter wall or shoulder (7*b*). When placed, cap (30) creates a sealed space defined by the bottom surface (31) of cap (30), platform (7), and assay device component (1*a*). Both inlet port (3*a*) and outlet port (4*a*) are positioned in sealed space thereby defining a fluid conduit starting at inlet port (3*a*) and ending at outlet port (4*a*) while running through the entirety of sealed space. This fluid conduit allows for placement of a hydrophobic fluid layer over wells (10) as per above.

Device Preparation

The assay device component (1*a*) and other supporting structures described herein can comprise any of a number biocompatible materials including but not limited to polymers such as cyclic olefin polymers (COP) which are commercially available from available from Zeon Specialty Materials, Inc. (San Jose, Calif., USA), cyclic olefin copolymers (COC) which are commercially available from a number of sources such as Polyplastics USA, Inc. (Farmington Hills, Mich., USA), polyimides which are commercially available from a number of sources such as Putnam Plastics (Dayville, Conn., USA), polycarbonates which are commercially available from a number of sources such as Foster Corporation (Putnam, Conn., USA), polydimethylsiloxanes which are commercially available from Edge Embossing (Medford, Mass., USA) and polymethylmethacryate which is commercially available from Parchem Fine & Specialty Chemicals (New Rochelle, N.Y., USA).

The wells (10) of assay device component (1*a*) of this invention can be readily prepared by hot embossing methods which are well known in the art and comprise stamping a pattern into a polymer softened by heating the polymer to a temperature just above its glass transition temperature. Subsequent cooling of the polymer provides for a high density of wells in the devices described herein. Alternatively, mold injection techniques can be used and are well known in the art. Still further, a solid block of a biocompatible polymer can be laser etched to introduce the desired number of wells having the appropriate size, volume and shape as well as with the desired well density.

In forming wells (10), each partition (16) is preferably at least about 10 microns in length distant from a first well (10*a*) to its nearest neighboring well (10*b*). However, smaller distances are contemplated such as at least about 5 microns from a first well (10*a*) to its nearest neighboring well (10*b*) or even at least about 1 micron from a first well (10*a*) to its nearest neighboring well (10*b*). This minimal distance between wells (10) ensures well integrity such that a homogenous aqueous solution (no spill-over) is included in each well (10) and that each well (10) contain one or more beads where the bead(s) contain multiple copies of the same test compound bound thereto. In a preferred embodiment, the partitions (16) have a length as measured from a nearest neighbor well of about 20 microns and, more preferably from about 20 microns to less than about 50 microns in length. Sizes can be any value or subrange within the recited ranges, including endpoints.

Wells (10) are generated by a conventional hot embossing method where a sheet of thermoplastic polymer is heated to a temperature slightly higher than its glass transition temperature in order to soften the plastic. A stamp is selected that comprises a number of circular prongs uniformly placed on its surface at a desired density. Each prong is sized to have diameter and a depth correlating to the size of the wells (10) described above. The distance between any two adjacent prongs is at least about 10 microns (i.e., partition (3) is at least about 10 microns thick). The stamp is sized so that the portion comprising the prongs fits within the top surface of the sheet. Sufficient force is applied to the stamp so as to ensure that the full length of the prongs sink into the sheet. The force required is dependent on the degree of softness of the sheet and is readily ascertainable by the skilled artisan. As the sheet cools, the prongs are removed so as to provide for a sheet now containing wells (10) and partitions (16).

Alternatively, the partially formed device (1), with or without platform (7) as part of the monolithic structure, can be prepared by conventional injection molding using two mold halves—one with protrusions corresponding to those of the stamp (male mold half) and the other forming the base of the device (female mold half). The mold halves are juxtaposed to each other so as to form a cavity in the shape of the device (1). Injection of a monomer or reactive oligomer composition into this cavity followed by polymerization provides for a device (1) (with or without platform (7)) now containing wells (10) and partitions (16).

In one embodiment, after heat embossment or mold formation, a silicon dioxide coating may be applied to the top surface of device (1) including a bottom surface (i.e., floor wall of well (10) by conventional sputtering technology. Preferably, the thickness of the silicon dioxide layer is from about 0.5 to about 100 nanometers and more preferably about 10 to 50 nanometers (value can be any value or subrange within the recited ranges, including endpoints). The silicon dioxide coating provides a reactive layer that binds both a water repelling, biocompatible layer.

As to the specifics of construction of device (1), after application of the silicon dioxide coating on the top surfaces of device (1) including the bottom surface of wells (10), each partition (16) is then modified to include a biologically compatible, hydrophobic, water repellant layer that inhibits spill-over of aqueous solution from one well to another. The water repelling layer comprises a biologically compatible, hydrophobic, water repellant material such as polyethylene, polypropylene, block copolymers of ethylene and propylene, polytetrafluoroethylene, (trichloro)octadecyltsilane (OTS), amorphous fluoropolymers (such as CYTOP®), and polydimethylsiloxane (PDMS), and the like.

The biocompatible water repellent layer is generated by conventional coating techniques. For example, one such technique involves applying a solution of a biocompatible water repellent material dissolved in a suitable solvent compatible with the device (e.g., ethanol) onto a disc. The disc is then spun so as to create a thin solution film of about 1-5 microns. The spinning is stopped and then top surface of device (1) is placed onto/into the thin film. Device (1) is disengaged from the disc within about 1 to 5 minutes and then dried to form water repellent layer which is about 1 to 5 microns in thickness. Values can be any value or subrange within the recited ranges, including endpoints.

In an alternative embodiment, formation of the water repellent biocompatible layer is then conducted by injection molding to a desired thickness. As the addition of the water repelling biocompatible layer adds to the depth of each of the wells, it is understood that the total depth of the wells described above refers to that depth after formation of the water repelling layer.

In some embodiments, the assay device component can further comprise a target capturing (layer) element onto the bottom of wells (10). This can serve to prevent movement of any assay component (60) within well (10). An exemplary target capturing element is poly-D-lysine (PDL) which is used for illustrative purposes only. Sufficient PDL is dissolved into an aqueous solution so as to achieve a concentration of, e.g., about 0.1 mg/mL. PDL is commercially available from numerous sources. One source of PDL is from ThermoFisher Scientific, 10010 Mesa Rim Road, San Diego, Calif. USA as catalog no. A389040. Other examples of target capturing element include: fibronectin (ThermoFisher Scientific, catalog no. 33016015), vitronectin (Sigma Aldrich, catalog no. 5051), and the like.

Partially formed device (1), without the PDL target capturing element, is immersed into the container comprising the PDL solution. The immersion continues for about 1 hour. Device (1) is then removed and then dried. The hydrophobic coating on the top surface of device (1) retards deposition of PDL on that surface thereby providing the target capturing element on the bottom surface of wells (10) and perhaps on the side walls of well (10).

The target capturing element is biologically compatible with the bottom surface (12) of well (10) and either adheres to the target at the site of deposition so as to impede target translocation once deposited or is biologically compatible with the target when target is in solution or is a suspension. Preferably, the overall character of target capturing element is hydrophilic although areas of hydrophobicity are permitted. In one embodiment, target capturing element is selected to adhere to the bottom surface (12) of well (10) and to the target deposited thereon. In embodiments, the binding of the target to the target capturing element provides for a Kd of no more than about 1×10−3 and more preferably no more than about 1×10−5 μmol/μL (value can be any value or subrange within the recited ranges, including endpoints). Target capturing elements include materials such as poly(amino acids), DNA, RNA, siRNA, antibodies, antibody fragments, proteins, polypeptides, and the like. The particular target capturing element is selected relative to the target employed and such a selection is well known to the skilled artisan. In one embodiment, the target is a mammalian cell such as a human Hela cell and the target capturing element is a polymer of D-lysine (PDL). Polymers of D-Lysine having from about 1×109 to about 1×1014 lysine residues are preferred (value can be any value or subrange within the recited ranges, including endpoints).

The term "target" means a material such as a biological material that one wishes to assess the binding affinity of a test compound to that target and optionally the biological consequences of such binding. Exemplary targets include monoclonal or polyclonal antibodies, fragments of monoclonal or polyclonal antibodies, mammalian cells, DNA, RNA, siRNA, proteins (e.g., fusion proteins, enzymes, cytokines, chemokines and the like), viruses, and the like. In one preferred embodiment, the target is a mammalian cell such as a human cell.

When the water repelling biocompatible layer is used in combination with a target capturing element, the devices (1) described herein allow for very high densities of wells per square millimeter as well as maintaining reproducible detection of a cell deposited in well (2) using electromagnetic energy detection means (e.g., light). The presence of a water repelling biocompatible layer described herein inhibits or eliminates spill-over of the aqueous solution from adjacent wells.

Incorporation of Platform

In one embodiment, platform (7) comprises a film or layer that fits over at least a portion of the top surface of assay device component (1*a*) other than over rows (20) and that portion extending from rows (20) to the inlet port (3*a*) and outlet port (4*a*). In one embodiment, such a layer or film (7*a*) can comprise a 2-sided tape such as pressure sensitive adhesive (PSA) that is configured to surround but not to extend over row (20). In another embodiment, such a layer or film (7*a*) can comprise a thin sheet of plastic also configured to surround but not to extend over row (20). PSA tape is very well known in the art and is available from a number of vendors including, by way of example only, Adhesive Transfer Tape F9473PC available from 3M Company, St. Paul, Minn., USA.

In one embodiment, platform (7) comprises a film (7*a*) that are preformed to contain cutouts for each of the rows (20) and extending from the proximal terminus of row (20) to inlet port (3*a*) and extending from the distal terminus of row (20) to outlet port (4*a*). Such sheets are preferably made conventional methods well known in the art.

In one embodiment, the platform (7) comprises shoulders (7*b*) that extend upward from top surface (2) or downward from the bottom surface (31) of cap (30). These shoulders (7*b*) are positioned to isolate row (20).

In general, platforms, whether as films (7*a*) or shoulders (7*b*) have a thickness (height) of from about 50 to about 1000 microns and preferably from about 100 to about 500 microns (value can be any value or subrange within the recited ranges, including endpoints).

Next, when employed, fluid inlet (3) and fluid outlet (4) are fixed to device component (lb). In one embodiment, fluid inlet (3) comprises an inlet reservoir and fluid outlet (4) comprises an outlet reservoir. Both reservoirs have a well partially extending downward from the top of the reservoirs but not through to the reservoir bottom. A hole is placed at the base of the reservoir and extending through and exits out of the reservoir where it meets with recessed row (20). The bottom terminus of said hole in inlet reservoir is identified as inlet port (3*a*) and the bottom of said hole in outlet reservoir is identified as outlet port (4*a*). The hole acts to meter the amount of fluid passing into sealed fluid passageway (5).

Alternatively, the wells in reservoirs extend downward from the top of the reservoirs and through to the reservoir bottom. At the base of each well is a sheet or film comprising a hole that aligns with the bottom of each reservoir. Each of said holes define either an inlet port (3*a*) or an outlet port (4*a*) and are employed to meter the amount of fluid passing through passageway (5).

Fabrication of fluid inlet (3) and fluid outlet (4) is done by conventional techniques such as injection molding. Likewise, plastic sheets used to form inlet ports (3*a*) and outlet ports (4*a*) are well known in the art and are made to be inert to the hydrophobic fluid used.

Placement of these components onto device component (lb) is also done by conventional techniques well known in the industry. For example, two-side tape such as PSA is used to adhere each inlet (3) and outlet (4) to platform (7). Alternatively, a UV inducible adhesive can be used or conventional chemical bonding.

Once these components are in place, the device is complete and ready to accept cap (30). However, prior to placement of cap (30), assay components are added to the wells by conventional techniques. One or more assay components can be added prior to or after placement of the inlets (3) and outlets (4) onto device component (lb).

Cap

Cap (30) comprises a biologically compatible and removable film or sheet that is reversibly adherent to platform (7). Such films or sheets are preferably gas permeable and are configured to match the contours of the platform to which it is to be attached. Examples of suitable films or sheets include Mylar plate sealer for microtiter plates from Thermo Fisher Scientific (supra). In one embodiment, the upper surface of cap (30) has an appendage such as a handle, tab, thread or any other element that facilitates removing the cap from the assay device (1).

Methods

In practice, wells (10) are first filled partially or completely with assay components and an aqueous solution that corresponds to the requirements of the assay to be run (e.g., pH, buffers, salts, and the like).

After filling, cap (30) is fitted onto platform (7) thereby forming a sealed conduit or passageway (7) that extends over each row (20) comprising wells (10). In order to protect the contents of each well (10) from contaminants and/or evaporation, a biocompatible hydrophobic fluid layer is introduced into inlet port (3) in sufficient amounts that said hydrophobic fluid layer flows downward into said inlet reservoir and exits out of inlet port (3*a*). Said hydrophobic fluid layer then flows over the surface (2) of row (20) filling any partially filled well (10) with said hydrophobic fluid which also accumulates in said passageway (5) up to the bottom surface (31) of cap (30). Excess hydrophobic fluid layer then traverses through outlet port (4*a*). Fluid is introduced from a suitable reservoir such as a pipette, a syringe or via a pump. The injection velocity of fluid is selected to provide for a horizontal flow over the surface of row (20) without disruption of the assay components (60) in wells (10). Preferably, fluid is injected at a velocity of no more than about 100 μL per second.

At this point, cap (30) can be maintained or removed and the assay allowed to continue until complete.

At the completion of the assay, the cap (if retained) is removed and the assay results quantified. Wells (10) showing biological activity are identified and the compound bound to said bead is determined.

What is claimed is:

1. A method of sealing wells of an assay device component to prevent contamination or evaporation of the wells, the wells comprising two rows of wells that have respective openings, the two rows of wells each extending from an end to an opposite end, each of the openings being coplanar with a top surface of a rectangular block of the assay device component, the method comprising:
- forming a conduit defined by:
  - the top surface of the rectangular block;
  - side walls extending above the first surface; and
  - a bottom surface of a cap disposed atop the first surface and extending between the side walls, wherein the forming of the conduit comprises:
  - adhering two layers directly onto the top surface of the rectangular block, wherein the two layers comprise two respective side surfaces that correspond to the side walls that define the conduit and the two layers are disposed on opposite sides of the two rows of wells;
  - adhering upper blocks onto the two layers, the upper blocks extending across a space between the two layers, wherein:
    - the upper blocks comprise a first upper block having an inlet reservoir and an inlet port, and a second upper block having an outlet reservoir and an outlet port,
    - the inlet port is at a bottom of the inlet reservoir and the outlet port is at a bottom of the outlet reservoir, and
    - the inlet port is positioned directly above the two rows of wells at the end and the output port is positioned directly above the two rows of wells at the opposite end; and
  - adhering the cap directly onto the two layers, wherein the cap extends between the two layers; and
- injecting a hydrophobic fluid via the inlet port to fill at least a portion of the conduit.

2. The method of claim 1, further comprising:
- determining whether excess hydrophobic fluid flows through the outlet port; and
- in response to determining that the excess hydrophobic fluid flows through the outlet port, terminating or slowing down the injection of the hydrophobic fluid.

3. The method of claim 1, wherein the formation of the conduit comprises positioning the cap to be substantially parallel to the top surface of the rectangular block to seal the wells.

4. The method of claim 3, wherein the formation of the conduit further comprises positioning the cap to be substantially orthogonal to the side walls.

5. The method of claim 1, further comprising, prior to the injection of the hydrophobic fluid, introducing respective individual assay components into the wells.

6. The method of claim 1, wherein the hydrophobic fluid is injected via a pipette, a syringe, or a pump.

7. The method of claim 1, wherein:

the inlet port is fluidly connected to the inlet reservoir, wherein the inlet reservoir extends partially above a top surface of the cap and partially below the top surface of the cap; and the injection of the hydrophobic fluid occurs through the inlet reservoir.

8. The method of claim 1, wherein:

the top surface, the side walls, and the cap extend from a proximal end of the assay device component to a distal end of the assay device component;

the wells are arranged between the proximal end and the distal end; and the inlet port is disposed adjacent to the proximal end, proximally with respect to the wells.

9. The method of claim 1, further comprising:

removing the cap; and conducting an assay to determine respective measures of biological activities within the wells.

* * * * *